(12) United States Patent
Harris et al.

(10) Patent No.: US 11,433,799 B2
(45) Date of Patent: Sep. 6, 2022

(54) VEHICLE ROOFTOP PLATFORM MOUNTING SYSTEMS WITH LEVELING SYSTEMS

(71) Applicant: Toyota Motor Engineering & Manufacturing North America, Inc., Plano, TX (US)

(72) Inventors: Ryan C. Harris, Saline, MI (US); Scott L. Frederick, Brighton, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 17/116,636

(22) Filed: Dec. 9, 2020

(65) Prior Publication Data
US 2022/0176864 A1 Jun. 9, 2022

(51) Int. Cl.
*B60P 3/36* (2006.01)
*B60P 3/34* (2006.01)
*E04H 15/06* (2006.01)

(52) U.S. Cl.
CPC .............. *B60P 3/36* (2013.01); *B60P 3/341* (2013.01); *E04H 15/06* (2013.01)

(58) Field of Classification Search
CPC .............. B60P 3/36; B60P 3/38; E04H 15/06
USPC .................................................. 296/160, 164
See application file for complete search history.

(56) References Cited

U.S. PATENT DOCUMENTS

| | | | |
|---|---|---|---|
| 2,440,821 A * | 5/1948 | Godwin | B60R 9/055 224/314 |
| 2,829,901 A | 4/1958 | Rush | |
| 3,257,019 A * | 6/1966 | Carroll | B60P 3/38 414/498 |
| 3,567,271 A | 3/1971 | Gostomski | |
| 3,642,242 A * | 2/1972 | Danekas | B60S 9/02 248/354.4 |
| 3,679,174 A * | 7/1972 | Boettcher | B60S 9/04 74/89.21 |
| 3,685,061 A * | 8/1972 | Wray | B60P 3/38 52/63 |
| 10,207,650 B1 * | 2/2019 | Banegas | B60R 9/06 |
| 2006/0043130 A1 * | 3/2006 | Dabrowski | B60R 9/055 224/328 |
| 2017/0349080 A1 * | 12/2017 | Sautter | E04H 15/06 |
| 2018/0055234 A1 * | 3/2018 | Strater | B60P 3/38 |
| 2018/0118127 A1 * | 5/2018 | Wymore | B60R 9/04 |
| 2019/0352924 A1 * | 11/2019 | Currid | B60P 3/38 |

FOREIGN PATENT DOCUMENTS

| | | | | |
|---|---|---|---|---|
| CN | 205875403 U | 1/2017 | | |
| CN | 206844801 U | 1/2018 | | |
| CN | 111519844 A | 8/2020 | | |
| DE | 10109054 A1 * | 9/2002 | | B60P 3/38 |
| GB | 2342931 B | 11/2000 | | |

* cited by examiner

*Primary Examiner* — D Glenn Dayoan
*Assistant Examiner* — Kevin P Weldon
(74) *Attorney, Agent, or Firm* — Dinsmore & Shohl LLP

(57) ABSTRACT

A vehicle rooftop platform mounting system includes a platform adjuster device that is configured to mount to a vehicle. The platform adjuster device includes a ball joint that rotatably connects a corner of a support platform to the platform adjuster device to adjust an angle of the corner of the support platform relative to a roof of the vehicle.

13 Claims, 2 Drawing Sheets

VEHICLE ROOFTOP PLATFORM MOUNTING SYSTEMS WITH LEVELING SYSTEMS

TECHNICAL FIELD

The present specification generally relates to vehicle rooftop mounting systems and, more specifically, to vehicle rooftop platform mounting systems with leveling systems for mounting and leveling platforms on automobiles.

BACKGROUND

Vehicle rooftop tents have become increasingly popular. The tents are often supported by a rooftop mounting system that mounts to roof rails of the vehicles. Once mounted on the vehicle, the pitch and roll of the rooftop mounting system can be dependent on the angle of the vehicle relative to horizontal. Current methods of adjusting the angle of the rooftop mounting systems are to adjust the angle of the vehicles by placing objects, such as rocks or blocks under one or more tires.

Accordingly, a need exists for vehicle rooftop platform mounting systems with leveling systems and associated methods.

SUMMARY

In one embodiment, a vehicle rooftop platform mounting system includes a platform adjuster device that is configured to mount to a vehicle. The platform adjuster device includes a ball joint that rotatably connects a corner of a support platform to the platform adjuster device to adjust an angle of the corner of the support platform relative to a roof of the vehicle.

In another embodiment, a method of adjusting an angular position of a support platform using a vehicle rooftop platform mounting system is provided. The method includes mounting four platform adjuster devices to two roof rails of a vehicle. At least one platform adjuster device includes a ball joint that rotatably connects a corner of the support platform to the at least one platform adjuster device to adjust an angle of the corner of the support platform relative to a roof of the vehicle. The ball joint and the corner is lifted using a lifting device of the at least one platform adjuster device thereby rotating the support platform relative to the roof of the vehicle using the ball joint.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include vehicle rooftop platform mounting systems that include leveling systems. The vehicle rooftop platform mounting systems can mount to a vehicle roof, such as to roof rails of the vehicles, and the leveling systems can be used to adjust positions of a support platform relative to a roof of the vehicles. The leveling systems may generally be located between the support platform and the vehicle roofs of the vehicles. The leveling systems may include one or more platform adjuster device that is located at one or more corners of the support platform. As will be described in greater detail below, the platform adjuster devices can be used to adjust both position and angle of the support platform relative to the vehicle roof.

Figure 1:
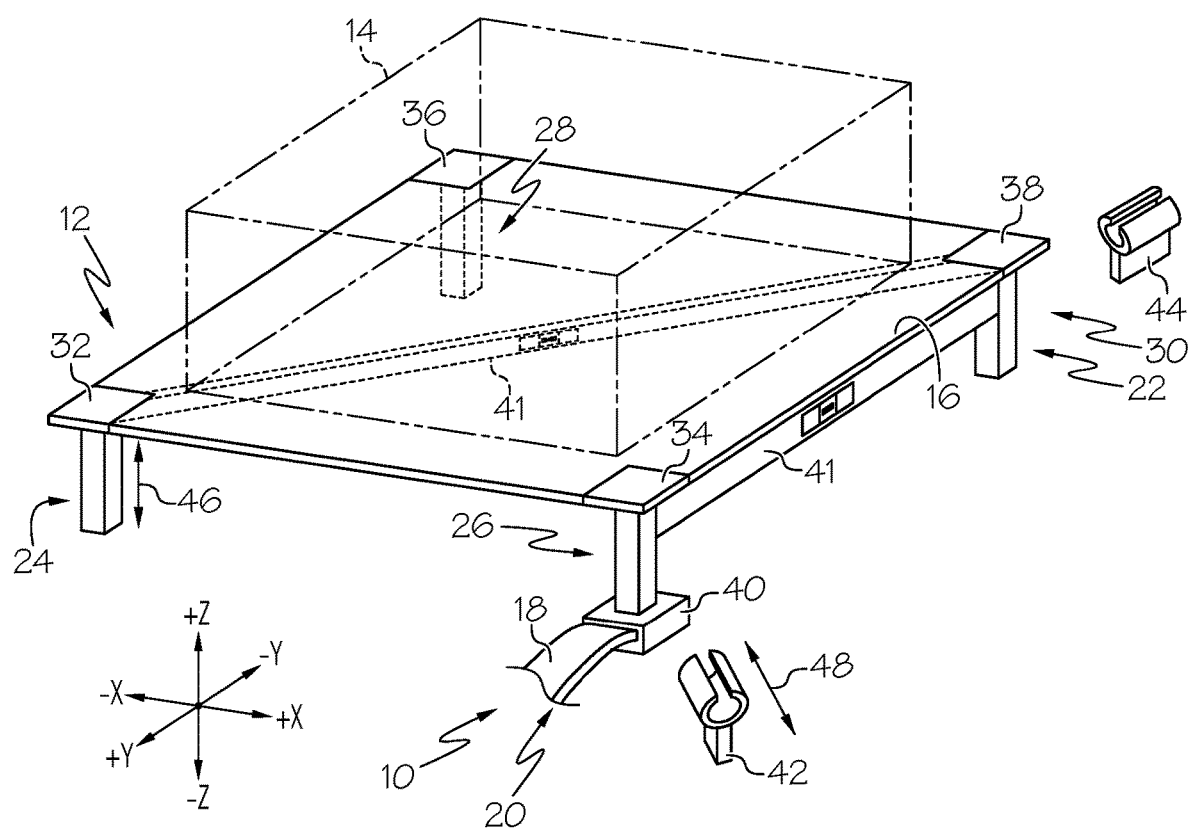
FIG. 1 diagrammatically depicts a vehicle rooftop platform mounting system with tent and portion of a vehicle, according to one or more embodiments shown and described herein.

As used herein, the term "vehicle longitudinal direction" refers to the forward-rearward direction of the vehicle (i.e., in the +/−vehicle Y direction depicted in FIG. 1). The term "vehicle lateral direction" refers to the cross-vehicle direction (i.e., in the +/−vehicle X direction depicted in FIG. 1), and is transverse to the vehicle longitudinal direction. The term "vehicle vertical direction" refers to the upward-downward direction of the vehicle (i.e., in the +/−vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

The terms "outboard" or "outward" as used herein refers to the relative location of a component in the direction away from a vehicle centerline. The term "inboard" or "inward" as used herein refers to the relative location of a component in the direction opposite of "outboard" or "outward." Because the vehicle structures may be generally symmetrical about the vehicle centerline, the direction to which use of terms "inboard," "inward," "outboard" and "outward" refer may be mirrored about the vehicle centerline when evaluating components positioned along opposite sides of the vehicle (represented by element 10).

Referring to FIG. 1, a vehicle rooftop platform mounting system 12 supports a tent 14 that is located on a support platform 16. As used herein, the term "tent" is meant to broadly refer to a shelter, which can be open on one or more sides and/or closed on one or more sides. The tent 14 may be formed of any suitable materials, such as canvas and/or plastic. The tent 14 may be a flexible material, such as canvas or cloth, or the tent 14 may be formed of a more rigid material such as a rigid plastic material. Further, the tent material may be waterproof and/or treated with a waterproof coating. It should be understood that the vehicle rooftop mounting systems described herein may or may not include the tent. That is, the tent may be provided as part of the vehicle rooftop mounting systems or may be provided separately from the vehicle rooftop mounting systems.

The tent 14 is supported on the support platform 16. The support platform 16 is mounted to roof rails 18 of a roof 20 of vehicle 10 using a leveling system 22. Only one of the roof rails is shown. The leveling system 22 is located generally between the support platform 16 and the roof 20. The leveling system 22 includes platform adjuster devices 24, 26, 28 and 30 that are located corners 32, 34, 36 and 38 of the support platform 16. One or more cross support beams 41 may connect the platform adjuster devices 24, 26, 28 and 30 that may also provide support for the support platform 16. The platform adjuster devices 24, 26, 28 and 30 may be mounted to the roof rails 18 either directly or indirectly. For example, the platform adjuster device 26 is shown mounted directly to the roof rail 18 by a clamp or bracket 40. The platform adjuster devices 24, 26, 28 and 30 may be indirectly mounted to the roof rails 18 using, for example, cross rails that mount to the roof rails 18. In that example, the platform adjuster devices 24, 26, 28 and 30 may be directly mounted to the cross rails and indirectly mounted to the roof rails through the cross rails.

The platform adjuster devices 24, 26, 28 and 30 allow for movement of the support platform 16 relative to the roof 20. As will be described in greater detail below, one, some or all of the platform adjuster devices 24, 26, 28 and 30 may include one or both of a lifting device, translation device and a rotation device. For example, the platform adjuster device 24 may be configured to extend and retract thereby raising and lowering the corner 32 of the support platform. However, side-to-side and front-to-back motion including diagonal motion (hereinafter collectively referred to as side-to-side motion) of the support platform 16 may be fixed at the platform adjuster device 24 to provide a datum for the system.

It can be appreciated that adjusting the height of the support platform 16 at the corner 32 using the platform adjuster device 24 can create stresses on all of the platform adjuster devices 24, 26, 28 and 30 and the support platform 16 itself. In this regard, the platform adjuster devices 24, 26, 28 and 30 are provided with one or more of the lifting, translation and rotation devices to allow for movement of the support platform 16 as the heights of the corners 32, 34, 36 and 38 are adjusted. In the example of FIG. 1, one, some or all of the platform adjuster devices 24, 26, 28 and 30 may include a ball joint. The ball joints can allow freedom of rotation of the support platform 16 relative to the platform adjuster devices 24, 26, 28 and 30. Further, one, some or all of the platform adjuster devices 24, 26, 28 and 30 may include a slide channel 42 and 44 that receive balls thereby forming the ball joints. The slide channels 42 and 44 allow side-to-side movement of the support platform 16 as the corners 32, 34, 36 and 38 are raised and lowered in order to adjust pitch and roll of the support platform relative to the vehicle 10.

Figure 2:
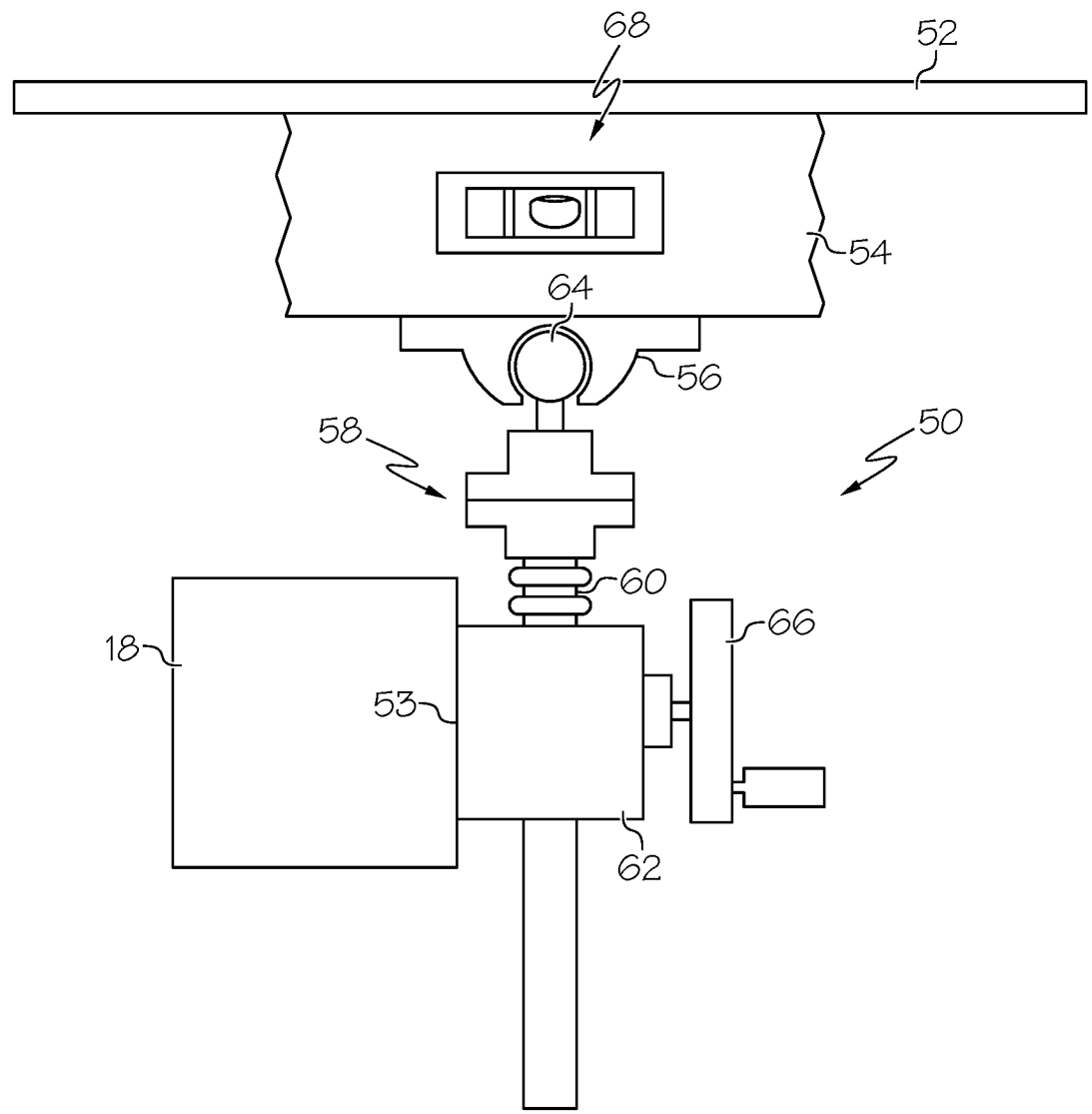
FIG. 2 diagrammatically depicts a platform adjuster device that can be used as part of a vehicle rooftop mounting system, according to one or more embodiments shown and described herein.

Referring now to FIG. 2, an exemplary platform adjuster device 50 is illustrated for use with a support platform 52. As described above, the support platform 52 is mounted to the roof rail 18 using a ball joint, which is collectively a ball 64 and a U-shaped slide channel 56. The slide channel 56 is shaped to allow both rotation of the support platform 52 relative to the platform adjuster device 50 and also side-to-side movement (into and out of the page) of the support platform 52 relative to the platform adjuster device 50. A lifting device 60, such as a jack, can be used to raise and lower a corner of the support platform 52. The lifting device 60 may include a housing 62 that contains, for example, a rack and pinion gear arrangement that allows for raising and lowering the support platform 52. The housing 62 may be mounted to the roof rail 18 by a bracket, which is represented by element 53. A handle 66, such as a hand crank, may be provided to facilitate manually raising and lowering of the lifting device 60. In some embodiments, the lifting device 60 may be powered, such as by using a motor or pneumatic power for raising and lowing the lifting device. In this regard, the lifting devices 60 may be electronically controlled, such as using a remote of computing device with software, such as an application on a smartphone, for controlling rotational position of the support platform 52. For example, the positions of the lifting devices 60 may be monitored by sensors, which provide signals indicative of position to a controller, which sends signals to a portable electronic device, such as a smartphone for use in controlling position of the support platform 52. In some embodiments, the signals may be provided to the electronic computing device directly.

The slide channel 56 is mounted to a support beam 54. The support beam 54 may run between platform adjuster devices 50 located at the corners of the support platform 52 and provides added support for the support platform 52. A leveling device 68, such as a bubble level, may be provided on the support beam 54 and/or the support platform 52 to provide an indication of rotational position relative to horizontal. In some embodiments, the leveling device may include a sensor that can provide a signal indicative of angle from horizontal to the controller or to a computing device directly for use in a leveling operation.

The above-described vehicle rooftop platform mounting systems include leveling systems that allow for rotational (i.e., pitch and roll) adjustment of support platforms relative to the vehicles to which they are mounted. In this regard, the "levelness" of the support platforms can be adjusted without a need for adjusting a position of the vehicles themselves. Such platform mounting systems can make it easier to park and set up a tent at terrain other than horizontal terrain or at rocky and/or uneven terrain.

It is noted that the terms "substantially" and/or "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle rooftop platform mounting system comprising a platform adjuster device configured to mount to a vehicle, the platform adjuster device comprising a ball joint that rotatably connects a corner of a support platform to the platform adjuster device to adjust an angle of the corner of the support platform relative to a roof of the vehicle;
    wherein the ball joint comprises a slide channel that receives a ball forming the ball joint, the slide channel allowing side-to-side movement of the support platform relative to the roof of the vehicle.

2. The vehicle rooftop platform mounting system of claim 1, wherein the platform adjuster device comprises a bracket configured to mount to a roof rail of the vehicle.

3. The vehicle rooftop platform mounting system of claim 1, wherein the ball is connected to a lifting device that is configured to raise and lower the ball and the corner of the support platform.

4. The vehicle rooftop platform mounting system of claim 3 further comprising a leveling device that provides an indication of angular position of the support platform relative to horizontal.

5. The vehicle rooftop platform mounting system of claim 3, wherein the lifting device comprises a handle that can be used to manually raise and lower the lifting device.

6. The vehicle rooftop platform mounting system of claim 1 further comprising a support platform and four platform adjuster devices, wherein each platform adjuster device is configured to mount to the corner of the support platform.

7. The vehicle rooftop platform mounting system of claim 6 further comprising a tent that is sized and configured to rest on the support platform.

8. A method of adjusting an angular position of a support platform using a vehicle rooftop platform mounting system, the method comprising:

mounting four platform adjuster devices to two roof rails of a vehicle, wherein at least one platform adjuster device comprises a ball joint that rotatably connects a corner of the support platform to the at least one platform adjuster device to adjust an angle of the corner of the support platform relative to a roof of the vehicle; and lifting the ball joint and the corner using a lifting device of the at least one platform adjuster device thereby rotating the support platform relative to the roof of the vehicle using the ball joint.

9. The method of claim 8, wherein the platform adjuster devices each comprise a bracket configured to mount to one of the roof rails of the vehicle.

10. The method of claim 8, wherein the ball joint comprises a slide channel that receives a ball forming the ball joint, the slide channel allowing side-to-side movement of the support platform relative to the roof of the vehicle during the step of lifting.

11. The method of claim 8 further comprising providing an indication of angular position of the support platform relative to horizontal using a leveling device.

12. The method of claim 8, wherein the lifting device comprises a handle that can be used to manually raise and lower the lifting device.

13. The method of claim 8 further comprising raising a tent, the support platform supporting the tent.

* * * * *